(12) United States Patent
Atwood et al.

(10) Patent No.: US 11,319,038 B1
(45) Date of Patent: May 3, 2022

(54) SYSTEMS AND METHODS FOR DECONTAMINATING WATERCRAFT

(71) Applicant: Clean Wake, LLC, Highland, UT (US)

(72) Inventors: Garrett Atwood, Highland, UT (US); Jonas Hyita, Saratoga Springs, UT (US)

( * ) Notice: Subject to any disclaimer, the term of this patent is extended or adjusted under 35 U.S.C. 154(b) by 0 days.

(21) Appl. No.: 17/374,771

(22) Filed: Jul. 13, 2021

Related U.S. Application Data

(60) Provisional application No. 63/133,060, filed on Dec. 31, 2020.

(51) Int. Cl.
| | |
|---|---|
| *B63B 59/06* | (2006.01) |
| *B63J 4/00* | (2006.01) |
| *B63B 39/02* | (2006.01) |
| *C02F 1/00* | (2006.01) |
| *C02F 103/44* | (2006.01) |
| *C02F 103/00* | (2006.01) |

(52) U.S. Cl.
CPC .............. *B63B 59/06* (2013.01); *B63B 39/02* (2013.01); *B63J 4/002* (2013.01); *C02F 1/004* (2013.01); *C02F 2103/008* (2013.01); *C02F 2103/44* (2013.01); *C02F 2201/001* (2013.01)

(58) Field of Classification Search
None
See application file for complete search history.

(56) References Cited

U.S. PATENT DOCUMENTS

| | | | | |
|---|---|---|---|---|
| 1,319,550 | A * | 10/1919 | Wilson | B63B 59/08 114/222 |
| 3,533,422 | A * | 10/1970 | Alimanestiano | B60S 3/04 134/45 |
| 3,752,109 | A * | 8/1973 | Seiple | B63B 59/08 114/222 |
| 4,030,440 | A * | 6/1977 | Wickersham | B63B 59/06 114/222 |
| 4,282,822 | A * | 8/1981 | Jackson | B63B 59/045 114/222 |
| 4,510,877 | A * | 4/1985 | Bloxham | B63C 1/06 114/45 |
| 4,784,078 | A * | 11/1988 | Feurt | B63B 59/08 114/222 |

(Continued)

*Primary Examiner* — Robert J Popovics
(74) *Attorney, Agent, or Firm* — Kirton McConkie; Adam D. Stevens

(57) ABSTRACT

A system for watercraft decontamination includes a substantially water-tight vessel sized and shaped to accommodate a watercraft, the vessel containing water and including a structure adapted to facilitate disposition of the watercraft in the vessel such that the a rear portion and transom of the watercraft that are normally submerged in watercraft use are submerged in the water. The system further includes a water heating system operatively connected to the substantially water-tight vessel, so as to heat the water from the vessel, and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100° Fahrenheit (38° Celsius) and approximately 110° Fahrenheit (43 degrees Celsius).

17 Claims, 7 Drawing Sheets

(56) References Cited

U.S. PATENT DOCUMENTS

| | | | | |
|---|---|---|---|---|
| 5,013,184 A * | 5/1991 | Omachi | E02C 1/06 | 405/85 |
| 5,138,963 A * | 8/1992 | Eichert | B63B 59/045 | 114/222 |
| 5,148,777 A * | 9/1992 | Brockhurst | B63H 20/36 | 123/198 E |
| 5,355,823 A * | 10/1994 | Goldbach | B05B 16/80 | 114/222 |
| 5,389,266 A * | 2/1995 | Clum | C02F 1/02 | 134/19 |
| 5,398,632 A * | 3/1995 | Goldbach | B63C 5/02 | 114/222 |
| 5,549,069 A * | 8/1996 | Faidi | B63B 59/045 | 114/222 |
| 5,732,646 A * | 3/1998 | Brandt | B08B 3/02 | 114/122 |
| 6,327,991 B1 * | 12/2001 | Eichert | B63B 59/08 | 114/222 |
| 6,655,396 B2 * | 12/2003 | Krenzel | B08B 3/026 | 134/104.1 |
| 6,773,611 B2 * | 8/2004 | Perlich | C02F 1/686 | 210/758 |
| 6,799,591 B2 * | 10/2004 | McCormick | B08B 17/00 | 134/104.2 |
| 6,895,978 B2 * | 5/2005 | Midkiff | B60S 3/042 | 134/104.1 |
| 7,013,821 B2 * | 3/2006 | Sakurai | B63B 59/08 | 114/222 |
| 7,025,889 B2 * | 4/2006 | Brodie | B63B 17/00 | 210/153 |
| 7,118,633 B2 * | 10/2006 | Jenkins | B08B 17/00 | 134/10 |
| 7,121,288 B2 * | 10/2006 | Jenkins | B08B 17/00 | 134/201 |
| 7,203,979 B2 * | 4/2007 | O'Brien | A47K 3/286 | 239/279 |
| 7,258,749 B2 * | 8/2007 | McCormick | B08B 17/00 | 134/10 |
| D555,303 S * | 11/2007 | Taylor | D32/4 | |
| 7,530,362 B2 * | 5/2009 | McCormick | B08B 17/025 | 134/104.1 |
| 7,540,295 B2 * | 6/2009 | McCormick | B08B 17/00 | 134/104.1 |
| 7,775,221 B2 * | 8/2010 | Zeile | B60S 3/04 | 134/123 |
| 7,823,523 B2 * | 11/2010 | Perez | B63C 1/02 | 114/45 |
| 7,943,040 B2 * | 5/2011 | Taylor | C02F 1/008 | 210/167.3 |
| 7,987,862 B2 * | 8/2011 | McCormick | B08B 3/026 | 134/123 |
| 8,211,317 B2 * | 7/2012 | Nguyen | B63B 35/00 | 210/748.11 |
| 8,267,100 B2 * | 9/2012 | McCormick | B08B 17/025 | 134/123 |
| 8,272,390 B2 * | 9/2012 | McCormick | B08B 17/025 | 134/123 |
| 8,501,004 B2 * | 8/2013 | Lee | B01D 29/682 | 210/251 |
| 8,506,720 B2 * | 8/2013 | Petter | B08B 17/025 | 134/10 |
| 8,597,434 B2 * | 12/2013 | Barrios | B60P 3/2265 | 134/115 R |
| 8,721,805 B2 * | 5/2014 | Barrios | B60P 3/22 | 134/115 R |
| 8,864,910 B2 * | 10/2014 | Petter | B08B 3/14 | 134/10 |
| 9,266,590 B1 * | 2/2016 | Dye | B63B 3/08 | |
| 9,387,913 B1 * | 7/2016 | Dye | B63C 1/02 | |
| 9,650,020 B1 * | 5/2017 | Bindas | B08B 17/025 | |
| 10,065,551 B1 * | 9/2018 | Zanette | B60P 3/1033 | |
| 10,558,512 B2 * | 2/2020 | Palmer | C02F 1/325 | |
| 10,794,129 B2 * | 10/2020 | Avalon | B07B 1/46 | |
| 10,800,497 B2 * | 10/2020 | Watten | B08B 3/08 | |
| 2002/0117191 A1 * | 8/2002 | Krenzel | B08B 3/026 | 134/104.1 |
| 2003/0029811 A1 * | 2/2003 | Russell | C02F 1/76 | 210/749 |
| 2004/0134861 A1 * | 7/2004 | Brodie | B63B 17/00 | 210/748.11 |
| 2004/0231703 A1 * | 11/2004 | McCormick | B60S 3/04 | 134/10 |
| 2006/0157094 A1 * | 7/2006 | Zeile | B63B 59/10 | 134/123 |
| 2007/0246424 A1 * | 10/2007 | Honda | B63B 13/00 | 210/636 |
| 2008/0000507 A1 * | 1/2008 | Snyder | B08B 17/025 | 134/123 |
| 2009/0045134 A1 * | 2/2009 | Veki | C02F 1/78 | 210/620 |
| 2009/0266387 A1 * | 10/2009 | McCormick | B08B 17/025 | 134/123 |
| 2011/0097677 A1 * | 4/2011 | Ryan | B08B 5/04 | 432/1 |
| 2011/0243663 A1 * | 10/2011 | Smith | B63C 1/02 | 405/3 |
| 2013/0098399 A1 * | 4/2013 | Zeile | B08B 17/025 | 134/10 |
| 2013/0098403 A1 * | 4/2013 | Zeile | B08B 3/00 | 134/18 |
| 2019/0185117 A1 * | 6/2019 | Watten | B08B 3/10 | |
| 2019/0337826 A1 * | 11/2019 | Fahs, II | C02F 1/001 | |
| 2021/0269131 A1 * | 9/2021 | Michaeli | G05D 23/1917 | |

\* cited by examiner

SYSTEMS AND METHODS FOR DECONTAMINATING WATERCRAFT

CROSS-REFERENCE TO RELATED APPLICATIONS

This application claims the benefit of U.S. Provisional Application No. 63/133,060, filed Dec. 31, 2020, which is incorporated herein by reference for all it discloses.

BACKGROUND OF THE INVENTION

1. Field of the Invention

The present invention relates to systems and methods for decontaminating watercraft, and more particularly to systems and methods for decontaminating watercraft, such as recreational watercraft, from invasive aquatic species to prevent invasive species transfer between bodies of water.

2. Background and Related Art

The transfer of invasive aquatic species, such as zebra mussels and quagga mussels, between bodies of water is of significant concern. These invasive species contaminate waterways and bodies of water, clog and disable water intake systems of hydroelectric systems and water-transfer systems, and compete with and often outcompete natural species. These species have substantial ecological and environmental impact on waterways and bodies of water to which they are introduced. Zebra mussels and quagga mussels are believed to have originated in Russia and the Ukrainian portion of the Black Sea, respectively, and are thought to have been introduced to the Great Lakes of North America by way of ballast water discharge from transoceanic ships that were carrying veligers (planktonic larvae), juvenile, and/or adult mollusks. These species have since spread to other bodies of water in North America, including Lake Mead and Lake Powell on the Colorado River drainage.

Because of the negative impacts of these invasive species, and their ability to rapidly proliferate, significant and costly efforts are underway to prevent further spread of these species to other bodies of water. Adult mussels can live for several days outside of water, and veligers are capable of living for significant amounts of time in water remaining in ballast tanks, engine cooling systems, or other water-containing portions of boats. Accordingly, it is critical for watercraft, such as recreational watercraft, used in contaminated bodies of water to either undergo decontamination procedures that are assured to kill all stages of mussel life or to remain dry and out of all water for sufficient time for all mussels thereon or therein to die, before the watercraft can be used in other uncontaminated bodies of water.

Current decontamination processes are labor-intensive, difficult to perform correctly, and potentially risky to laborers. Typical decontamination procedures involve spray application of very hot (approximately 140° F.) water to exterior surfaces of watercraft. The use of such hot water poses a significant safety risk to workers and others, as the water is hot enough to scald almost instantly. Also, workers must be sure to spray every inch of watercraft to ensure that all exterior surfaces are decontaminated. The exterior spraying is insufficient to ensure that veligers are eliminated from water-containing portions of the watercraft, such as ballast tanks, bilge tanks, or water-based engine cooling systems.

Accordingly, decontamination further includes connecting hot water sources to water intakes of the watercraft and pumping water through the various systems. Unfortunately, improper connection to such systems can lead to watercraft damage (impellers are commonly damaged, for example), or failure of the treatment to completely decontaminate the watercraft. Finally, the entire process can be quite lengthy, greatly inconveniencing watercraft owners and making them more susceptible to temptation to skip decontamination.

For these reasons, current decontamination systems and methods are inadequate to provide desired benefits to the industry and to prevent further spread of invasive aquatic species.

BRIEF SUMMARY OF THE INVENTION

Implementations of the invention provide systems and methods for decontaminating watercraft of a living contaminant using a hot-water vessel sized to receive the watercraft while trailered. Using the systems and methods of implementations of the invention, substantially safer water temperatures of between approximately 100 degrees Fahrenheit (approximately 38 degrees Celsius) and approximately 110 degrees Fahrenheit (approximately 43 degrees Celsius) are sufficient to decontaminate the watercraft. As necessary, simultaneous treatment of auxiliary watercraft items (anchors, ropes, water toys, buoys, etc.), ballast tanks, and bilges is achieved while treatment of the watercraft itself occurs. As necessary, depending on factors such as a length of time the watercraft spent in a contaminated body of water, additional traditional high-temperature water spot treatment may be used after treatment in the hot-water vessel is complete.

According to implementations of the invention, a system for decontamination of watercraft is provided. The system includes a substantially water-tight vessel sized and shaped to accommodate a watercraft to be decontaminated, the vessel containing water and including a structure adapted to facilitate disposition of the watercraft in the vessel such that the a rear portion and transom of the watercraft that are normally submerged in watercraft use are submerged in the water in the substantially water-tight vessel. The system further includes a water heating system operatively connected to the substantially water-tight vessel, so as to heat the water from the vessel and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100 degrees Fahrenheit (approximately 38 degrees Celsius) and approximately 110 degrees Fahrenheit (approximately 43 degrees Celsius).

In some implementations, the substantially water-tight vessel has a length of at least approximately 30 feet (approximately 9.1 meters), a width of at least approximately 14 feet (approximately 4.3 meters) and walls with a maximum height of at least approximately 6 feet (approximately 1.8 meters). In some implementations, the substantially water-tight vessel has an open end without a side wall and is disposed such that a bottom of the substantially water-tight vessel has a slope of between approximately 13% and approximately 17% (between approximately 7.4° and approximately 9.65° from horizontal). In some implementations, the bottom has a slope of approximately 15% (approximately 8.5° from horizontal).

In some implementations, the bottom is equipped with tire guides to keep a trailer on which the watercraft is disposed centered or otherwise properly positioned while being backed into the substantially water-tight vessel. In some implementations, the bottom is equipped with traction-assist treads to facilitate traction of a vehicle towing a trailer on which the watercraft is disposed.

In some implementations, the system further includes a water filtration system providing filtration of no greater than approximately 63 microns to capture veligers, wherein the water circulation system is adapted to turn over the water in the substantially water-tight vessel a minimum of approximately three times per day. In some implementations, the system further includes a plurality of shade balls disposed on a surface of the water in the substantially water-tight vessel so as to minimize water loss through evaporation, to retain heat, and reduce algae growth. In some implementations, the shade balls have a diameter of at least approximately three inches (approximately 7.6 cm). In some implementations, the system further includes a structure adapted to facilitate a person's entry to and exit from the watercraft while the watercraft is within the substantially water-tight vessel.

According to some implementations of the invention, a method for decontamination of watercraft includes disposing a watercraft in a substantially water-tight vessel containing water at a temperature of at least approximately 100 degrees Fahrenheit (approximately 38 degrees Celsius) until at least a rear portion and a transom of the watercraft that are normally submerged in watercraft use are submerged in the water in the substantially water-tight vessel and leaving the watercraft in the water an effective period of time sufficient to decontaminate the watercraft of a living contaminant. In some implementations, the water in the substantially water-tight vessel is at a temperature of between approximately 100 degrees Fahrenheit (approximately 38 degrees Celsius) and approximately 110 degrees Fahrenheit (approximately 43 degrees Celsius).

In some implementations, the method further includes, while the watercraft is disposed in the water, filling one or more ballast tanks of the watercraft with water from the substantially water-tight vessel, leaving the water in the one or more ballast tanks for an effective period of time sufficient to decontaminate the one or more ballast tanks of a living contaminant, and emptying the one or more ballast tanks. In some implementations, the method, further includes placing one or more auxiliary watercraft items previously disposed in a contaminated body of water into a basket and placing the basket with the one or more auxiliary watercraft items into the water in the substantially water-tight vessel while the watercraft is in the water in the substantially water-tight vessel such that the one or more auxiliary watercraft items is also decontaminated.

In some implementations, the method further includes transferring water from the substantially water-tight vessel into a bilge of the watercraft, leaving the water in the bilge of the watercraft an effective period of time sufficient to decontaminate the bilge of a living contaminant, and draining the bilge. In some implementations, the method further includes starting a motor of the watercraft while the watercraft is in the water in the substantially water-tight vessel and letting the motor of the watercraft run an effective period of time sufficient to decontaminate the motor of the watercraft of a living contaminant. In some implementations, the method further includes subjecting the watercraft to additional hot water spot treatment. In some implementations, disposing the watercraft in the substantially water-tight vessel includes backing the watercraft on a trailer down a sloped floor of the substantially water-tight vessel using a towing vehicle.

In some implementations, a system for decontamination of watercraft is used in the method. The system includes a substantially water-tight vessel sized and shaped to accommodate a watercraft to be decontaminated, the vessel containing water and including a structure adapted to facilitate disposition of the watercraft in the vessel such that the a rear portion and transom of the watercraft that are normally submerged in watercraft use are submerged in the water in the substantially water-tight vessel. The system further includes a water heating system operatively connected to the substantially water-tight vessel, so as to heat the water from the vessel and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100 degrees Fahrenheit (approximately 38 degrees Celsius) and approximately 110 degrees Fahrenheit (approximately 43 degrees Celsius).

In some implementations, the substantially water-tight vessel has a length of at least approximately 30 feet (approximately 9.1 meters), a width of at least approximately 14 feet (approximately 4.3 meters) and walls with a maximum height of at least approximately 6 feet (approximately 1.8 meters). In some implementations, the substantially water-tight vessel has an open end without a side wall and is disposed such that a bottom of the substantially water-tight vessel has a slope of between approximately 13% and approximately 17% (between approximately 7.4° and approximately 9.65° from horizontal). In some implementations, the bottom has a slope of approximately 15% (approximately 8.5° from horizontal).

In some implementations, the bottom is equipped with tire guides to keep a trailer on which the watercraft is disposed centered or otherwise properly positioned while being backed into the substantially water-tight vessel. In some implementations, the bottom is equipped with traction-assist treads to facilitate traction of a vehicle towing a trailer on which the watercraft is disposed.

In some implementations, the system further includes a water filtration system providing filtration of no greater than approximately 63 microns to capture veligers, wherein the water circulation system is adapted to turn over the water in the substantially water-tight vessel a minimum of approximately three times per day. In some implementations, the system further includes a plurality of shade balls disposed on a surface of the water in the substantially water-tight vessel so as to minimize water loss through evaporation, to retain heat, and reduce algae growth. In some implementations, the shade balls have a diameter of at least approximately three inches (approximately 7.6 cm). In some implementations, the system further includes a structure adapted to facilitate a person's entry to and exit from the watercraft while the watercraft is within the substantially water-tight vessel.

According to some implementations of the invention, a method for decontamination of watercraft includes steps of backing a trailered watercraft down a ramp into a substantially water-tight vessel containing water at a temperature of between approximately 100 degrees Fahrenheit (approximately 38 degrees Celsius) and approximately 110 degrees Fahrenheit (approximately 43 degrees Celsius) until at least a rear portion and a transom of the watercraft that are normally submerged in watercraft use are submerged in the water in the substantially water-tight vessel, starting an engine of the watercraft while the watercraft is in the substantially water-tight vessel, and leaving the watercraft in the water with the engine running an effective period of time sufficient to decontaminate the watercraft of a living contaminant.

In some implementations, the method further includes while the watercraft is disposed in the water, filling one or more ballast tanks of the watercraft with water from the substantially water-tight vessel, transferring water from the substantially water-tight vessel into a bilge of the watercraft, leaving the water in the one or more ballast tanks and in the bilge for an effective period of time sufficient to decontaminate the one or more ballast tanks and the bilge of a living contaminant, and emptying the one or more ballast tanks and the bilge.

In some implementations, the method, further includes placing one or more auxiliary watercraft items previously disposed in a contaminated body of water into a basket and placing the basket with the one or more auxiliary watercraft items into the water in the substantially water-tight vessel while the watercraft is in the water in the substantially water-tight vessel such that the one or more auxiliary watercraft items is also decontaminated. In some implementations, the method further includes subjecting the watercraft to additional hot water spot treatment.

In some implementations, the method further includes transferring water from the substantially water-tight vessel into a bilge of the watercraft, leaving the water in the bilge of the watercraft an effective period of time sufficient to decontaminate the bilge of a living contaminant, and draining the bilge. In some implementations, the method further includes letting the motor of the watercraft run an effective period of time sufficient to decontaminate the motor of the watercraft of a living contaminant.

In some implementations, a system for decontamination of watercraft is used in the method. The system includes a substantially water-tight vessel sized and shaped to accommodate a watercraft to be decontaminated, the vessel containing water and including a structure adapted to facilitate disposition of the watercraft in the vessel such that the a rear portion and transom of the watercraft that are normally submerged in watercraft use are submerged in the water in the substantially water-tight vessel. The system further includes a water heating system operatively connected to the substantially water-tight vessel, so as to heat the water from the vessel and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100 degrees Fahrenheit (approximately 38 degrees Celsius) and approximately 110 degrees Fahrenheit (approximately 43 degrees Celsius).

In some implementations, the substantially water-tight vessel has a length of at least approximately 30 feet (approximately 9.1 meters), a width of at least approximately 14 feet (approximately 4.3 meters) and walls with a maximum height of at least approximately 6 feet (approximately 1.8 meters). In some implementations, the substantially water-tight vessel has an open end without a side wall and is disposed such that a bottom of the substantially water-tight vessel has a slope of between approximately 13% and approximately 17% (between approximately 7.4° and approximately 9.65° from horizontal). In some implementations, the bottom has a slope of approximately 15% (approximately 8.5° from horizontal).

In some implementations, the bottom is equipped with tire guides to keep a trailer on which the watercraft is disposed centered or otherwise properly positioned while being backed into the substantially water-tight vessel. In some implementations, the bottom is equipped with traction-assist treads to facilitate traction of a vehicle towing a trailer on which the watercraft is disposed.

In some implementations, the system further includes a water filtration system providing filtration of no greater than approximately 63 microns to capture veligers, wherein the water circulation system is adapted to turn over the water in the substantially water-tight vessel a minimum of approximately three times per day. In some implementations, the system further includes a plurality of shade balls disposed on a surface of the water in the substantially water-tight vessel so as to minimize water loss through evaporation, to retain heat, and reduce algae growth. In some implementations, the shade balls have a diameter of at least approximately three inches (approximately 7.6 cm). In some implementations, the system further includes a structure adapted to facilitate a person's entry to and exit from the watercraft while the watercraft is within the substantially water-tight vessel.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
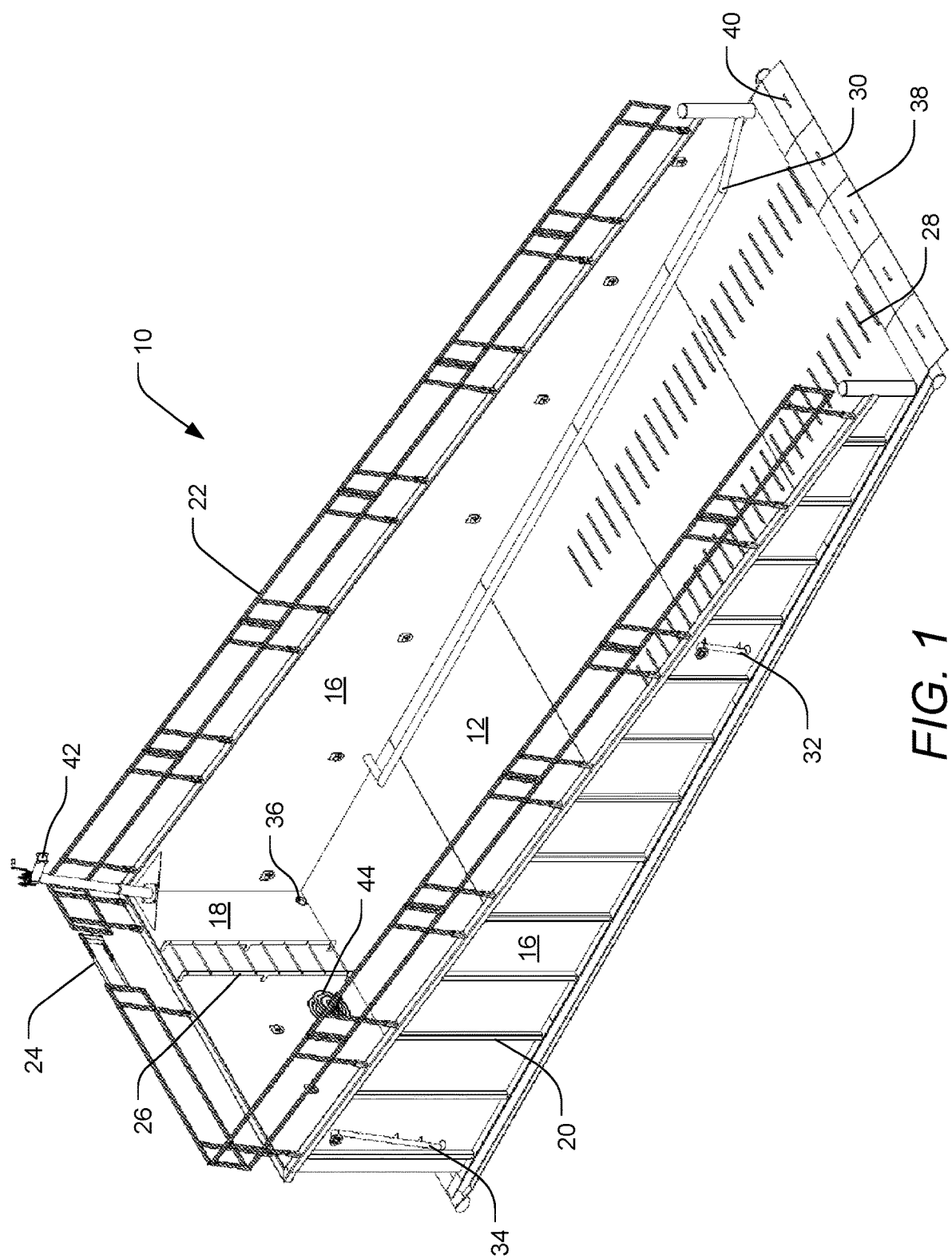
FIG. 1 illustrates a perspective view of an embodiment of a portion of a system for decontamination of watercraft, namely a substantially water-tight vessel or dip tank.
Figure 2:
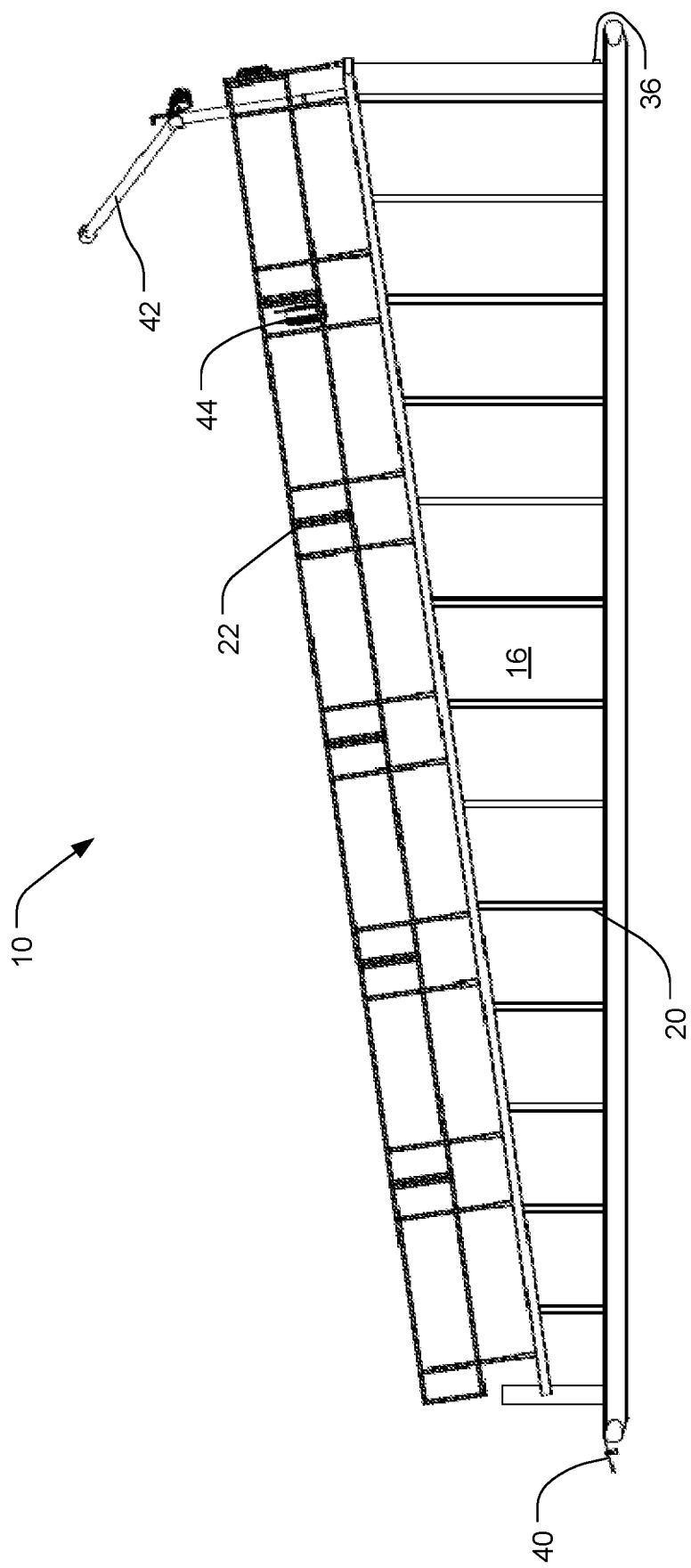
FIG. 2 illustrates a side view thereof.
Figure 3:
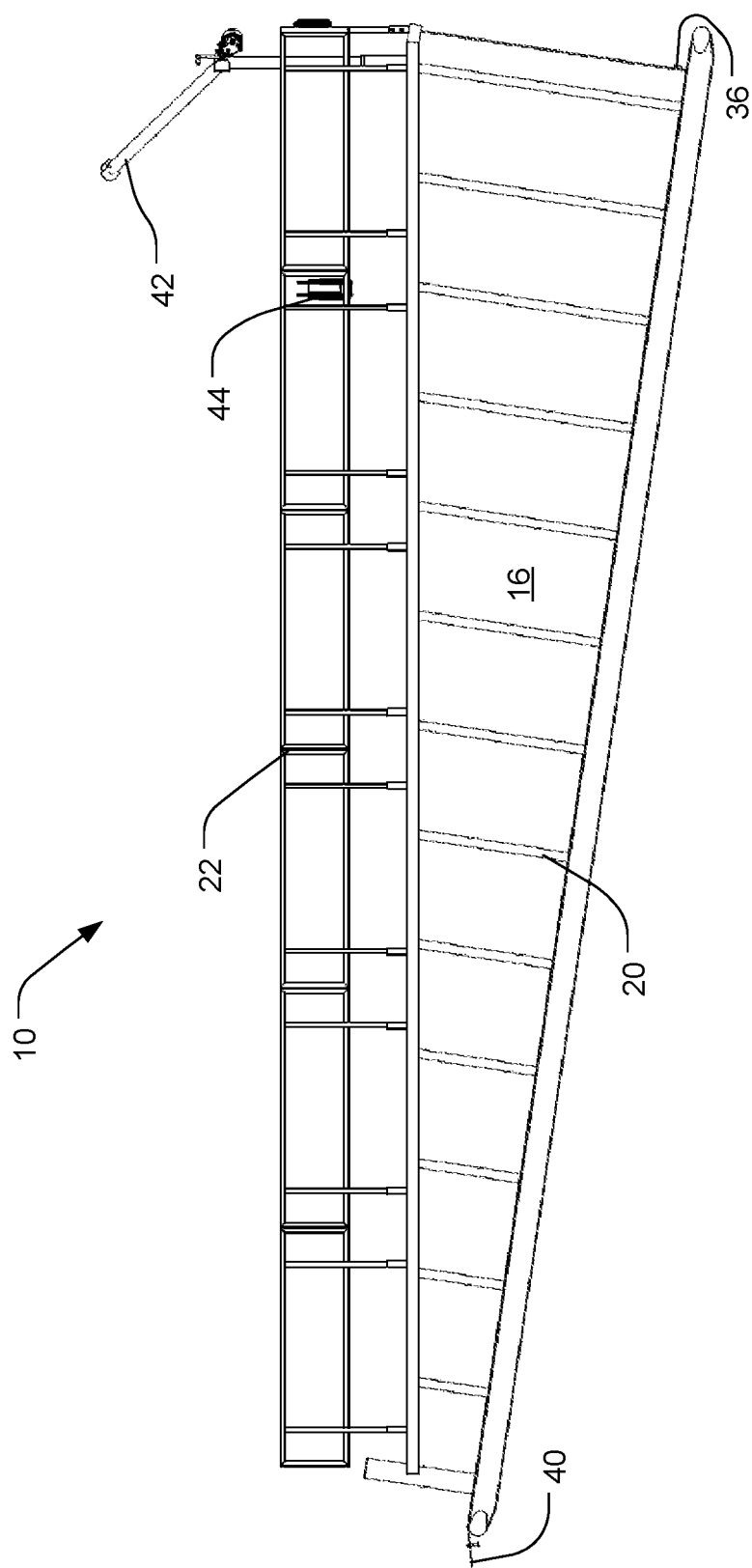
FIG. 3 illustrates an alternate side view thereof.
Figure 4:
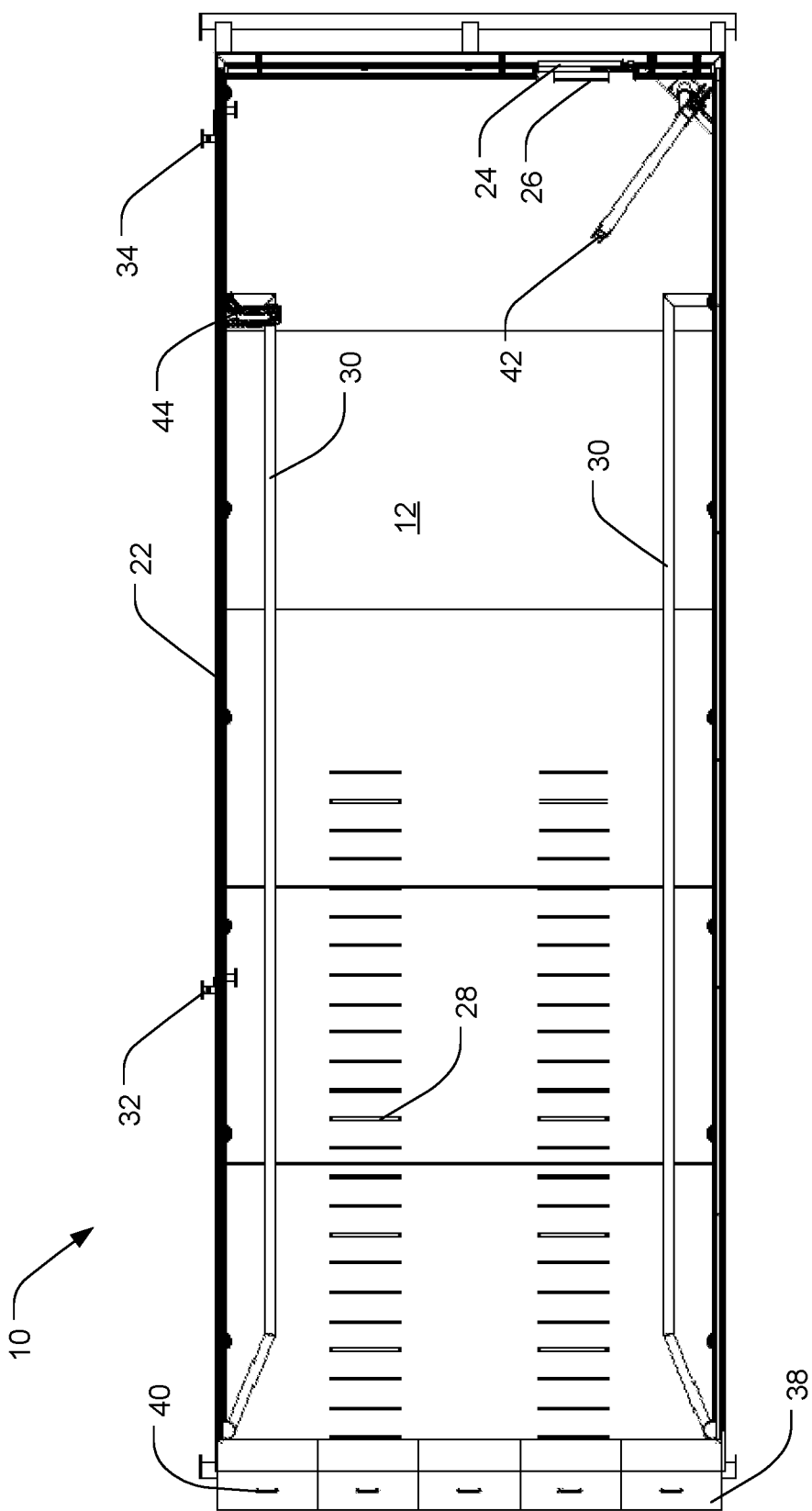
FIG. 4 illustrates a tip view thereof.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for decontaminating watercraft of a living contaminant using a hot-water vessel sized to receive the watercraft while trailered. Using the systems and methods of embodiments of the invention, substantially safer water temperatures of between approximately 100 degrees Fahrenheit (approximately 38 degrees Celsius) and approximately 110 degrees Fahrenheit (approximately 43 degrees Celsius) are sufficient to decontaminate the watercraft. As necessary, simultaneous treatment of auxiliary watercraft items (anchors, ropes, water toys, buoys, etc.), ballast tanks, and bilges is achieved while treatment of the watercraft itself occurs. As necessary, depending on factors such as a length of time the watercraft spent in a contaminated body of water, additional traditional high-temperature water spot treatment may be used after treatment in the hot-water vessel is complete.

According to embodiments of the invention, a system for decontamination of watercraft is provided. The system includes a substantially water-tight vessel sized and shaped to accommodate a watercraft to be decontaminated, the vessel containing water and including a structure adapted to facilitate disposition of the watercraft in the vessel such that the a rear portion and transom of the watercraft that are normally submerged in watercraft use are submerged in the water in the substantially water-tight vessel. The system further includes a water heating system operatively connected to the substantially water-tight vessel, so as to heat the water from the vessel and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100 degrees Fahrenheit (approximately 38 degrees Celsius) and approximately 110 degrees Fahrenheit (approximately 43 degrees Celsius).

In some embodiments, the substantially water-tight vessel has a length of at least approximately 30 feet (approximately 9.1 meters), a width of at least approximately 14 feet (approximately 4.3 meters) and walls with a maximum height of at least approximately 6 feet (approximately 1.8 meters). In some embodiments, the substantially water-tight vessel has an open end without a side wall and is disposed such that a bottom of the substantially water-tight vessel has a slope of between approximately 13% and approximately 17% (between approximately 7.4° and approximately 9.65° from horizontal). In some embodiments, the bottom has a slope of approximately 15% (approximately 8.5° from horizontal).

In some embodiments, the bottom is equipped with tire guides to keep a trailer on which the watercraft is disposed centered or otherwise properly positioned while being backed into the substantially water-tight vessel. In some embodiments, the bottom is equipped with traction-assist treads to facilitate traction of a vehicle towing a trailer on which the watercraft is disposed.

In some embodiments, the system further includes a water filtration system providing filtration of no greater than approximately 63 microns to capture veligers, wherein the water circulation system is adapted to turn over the water in the substantially water-tight vessel a minimum of approximately three times per day. In some embodiments, the system further includes a plurality of shade balls disposed on a surface of the water in the substantially water-tight vessel so as to minimize water loss through evaporation, to retain heat, and reduce algae growth. In some embodiments, the shade balls have a diameter of at least approximately three inches (approximately 7.6 cm). In some embodiments, the system further includes a structure adapted to facilitate a person's entry to and exit from the watercraft while the watercraft is within the substantially water-tight vessel.

According to some embodiments of the invention, a method for decontamination of watercraft includes disposing a watercraft in a substantially water-tight vessel containing water at a temperature of at least approximately 100 degrees Fahrenheit (approximately 38 degrees Celsius) until at least a rear portion and a transom of the watercraft that are normally submerged in watercraft use are submerged in the water in the substantially water-tight vessel and leaving the watercraft in the water an effective period of time sufficient to decontaminate the watercraft of a living contaminant. In some embodiments, the water in the substantially water-tight vessel is at a temperature of between approximately 100 degrees Fahrenheit (approximately 38 degrees Celsius) and approximately 110 degrees Fahrenheit (approximately 43 degrees Celsius).

In some embodiments, the method further includes, while the watercraft is disposed in the water, filling one or more ballast tanks of the watercraft with water from the substantially water-tight vessel, leaving the water in the one or more ballast tanks for an effective period of time sufficient to decontaminate the one or more ballast tanks of a living contaminant, and emptying the one or more ballast tanks. In some embodiments, the method, further includes placing one or more auxiliary watercraft items previously disposed in a contaminated body of water into a basket and placing the basket with the one or more auxiliary watercraft items into the water in the substantially water-tight vessel while the watercraft is in the water in the substantially water-tight vessel such that the one or more auxiliary watercraft items is also decontaminated.

In some embodiments, the method further includes transferring water from the substantially water-tight vessel into a bilge of the watercraft, leaving the water in the bilge of the watercraft an effective period of time sufficient to decontaminate the bilge of a living contaminant, and draining the bilge. In some embodiments, the method further includes starting a motor of the watercraft while the watercraft is in the water in the substantially water-tight vessel and letting the motor of the watercraft run an effective period of time sufficient to decontaminate the motor of the watercraft of a living contaminant. In some embodiments, the method further includes subjecting the watercraft to additional hot water spot treatment. In some embodiments, disposing the watercraft in the substantially water-tight vessel includes backing the watercraft on a trailer down a sloped floor of the substantially water-tight vessel using a towing vehicle.

In some embodiments, a system for decontamination of watercraft is used in the method. The system includes a substantially water-tight vessel sized and shaped to accommodate a watercraft to be decontaminated, the vessel containing water and including a structure adapted to facilitate disposition of the watercraft in the vessel such that the a rear portion and transom of the watercraft that are normally submerged in watercraft use are submerged in the water in the substantially water-tight vessel. The system further includes a water heating system operatively connected to the substantially water-tight vessel, so as to heat the water from the vessel and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100 degrees Fahrenheit (approximately 38 degrees Celsius) and approximately 110 degrees Fahrenheit (approximately 43 degrees Celsius).

In some embodiments, the substantially water-tight vessel has a length of at least approximately 30 feet (approximately 9.1 meters), a width of at least approximately 14 feet (approximately 4.3 meters) and walls with a maximum height of at least approximately 6 feet (approximately 1.8 meters). In some embodiments, the substantially water-tight vessel has an open end without a side wall and is disposed such that a bottom of the substantially water-tight vessel has a slope of between approximately 13% and approximately 17% (between approximately 7.4° and approximately 9.65° from horizontal). In some embodiments, the bottom has a slope of approximately 15% (approximately 8.5° from horizontal).

In some embodiments, the bottom is equipped with tire guides to keep a trailer on which the watercraft is disposed centered or otherwise properly positioned while being backed into the substantially water-tight vessel. In some embodiments, the bottom is equipped with traction-assist treads to facilitate traction of a vehicle towing a trailer on which the watercraft is disposed.

In some embodiments, the system further includes a water filtration system providing filtration of no greater than approximately 63 microns to capture veligers, wherein the water circulation system is adapted to turn over the water in the substantially water-tight vessel a minimum of approximately three times per day. In some embodiments, the system further includes a plurality of shade balls disposed on a surface of the water in the substantially water-tight vessel so as to minimize water loss through evaporation, to retain heat, and reduce algae growth. In some embodiments, the shade balls have a diameter of at least approximately three inches (approximately 7.6 cm). In some embodiments, the system further includes a structure adapted to facilitate a person's entry to and exit from the watercraft while the watercraft is within the substantially water-tight vessel.

According to some embodiments of the invention, a method for decontamination of watercraft includes steps of backing a trailered watercraft down a ramp into a substantially water-tight vessel containing water at a temperature of between approximately 100 degrees Fahrenheit (approximately 38 degrees Celsius) and approximately 110 degrees Fahrenheit (approximately 43 degrees Celsius) until at least a rear portion and a transom of the watercraft that are normally submerged in watercraft use are submerged in the water in the substantially water-tight vessel, starting an engine of the watercraft while the watercraft is in the substantially water-tight vessel, and leaving the watercraft in the water with the engine running an effective period of time sufficient to decontaminate the watercraft of a living contaminant.

In some embodiments, the method further includes while the watercraft is disposed in the water, filling one or more ballast tanks of the watercraft with water from the substantially water-tight vessel, transferring water from the substantially water-tight vessel into a bilge of the watercraft, leaving the water in the one or more ballast tanks and in the bilge for an effective period of time sufficient to decontaminate the one or more ballast tanks and the bilge of a living contaminant, and emptying the one or more ballast tanks and the bilge.

In some embodiments, the method, further includes placing one or more auxiliary watercraft items previously disposed in a contaminated body of water into a basket and placing the basket with the one or more auxiliary watercraft items into the water in the substantially water-tight vessel while the watercraft is in the water in the substantially water-tight vessel such that the one or more auxiliary watercraft items is also decontaminated. In some embodiments, the method further includes subjecting the watercraft to additional hot water spot treatment.

In some embodiments, the method further includes transferring water from the substantially water-tight vessel into a bilge of the watercraft, leaving the water in the bilge of the watercraft an effective period of time sufficient to decontaminate the bilge of a living contaminant, and draining the bilge. In some embodiments, the method further includes letting the motor of the watercraft run an effective period of time sufficient to decontaminate the motor of the watercraft of a living contaminant.

In some embodiments, a system for decontamination of watercraft is used in the method. The system includes a substantially water-tight vessel sized and shaped to accommodate a watercraft to be decontaminated, the vessel containing water and including a structure adapted to facilitate disposition of the watercraft in the vessel such that the a rear portion and transom of the watercraft that are normally submerged in watercraft use are submerged in the water in the substantially water-tight vessel. The system further includes a water heating system operatively connected to the substantially water-tight vessel, so as to heat the water from the vessel and a water circulation system operatively connected to the substantially water-tight vessel and the water heating system and adapted to circulate water between the water heating system and the substantially water-tight vessel. The water heating system is sized and configured to maintain a temperature of the water in the substantially water-tight vessel at a temperature of between approximately 100 degrees Fahrenheit (approximately 38 degrees Celsius) and approximately 110 degrees Fahrenheit (approximately 43 degrees Celsius).

In some embodiments, the substantially water-tight vessel has a length of at least approximately 30 feet (approximately 9.1 meters), a width of at least approximately 14 feet (approximately 4.3 meters) and walls with a maximum height of at least approximately 6 feet (approximately 1.8 meters). In some embodiments, the substantially water-tight vessel has an open end without a side wall and is disposed such that a bottom of the substantially water-tight vessel has a slope of between approximately 13% and approximately 17% (between approximately 7.4° and approximately 9.65° from horizontal). In some embodiments, the bottom has a slope of approximately 15% (approximately 8.5° from horizontal).

In some embodiments, the bottom is equipped with tire guides to keep a trailer on which the watercraft is disposed centered or otherwise properly positioned while being backed into the substantially water-tight vessel. In some embodiments, the bottom is equipped with traction-assist treads to facilitate traction of a vehicle towing a trailer on which the watercraft is disposed.

In some embodiments, the system further includes a water filtration system providing filtration of no greater than approximately 63 microns to capture veligers, wherein the water circulation system is adapted to turn over the water in the substantially water-tight vessel a minimum of approximately three times per day. In some embodiments, the system further includes a plurality of shade balls disposed on a surface of the water in the substantially water-tight vessel so as to minimize water loss through evaporation, to retain heat, and reduce algae growth. In some embodiments, the shade balls have a diameter of at least approximately three inches (approximately 7.6 cm). In some embodiments, the system further includes a structure adapted to facilitate a person's entry to and exit from the watercraft while the watercraft is within the substantially water-tight vessel.

Further details and information regarding exemplary embodiments of the invention are included in the appended exhibits, which are incorporated herein by reference for all they disclose. While embodiments of the invention include details and features in accordance with the description contained herein and in the exhibits, including in the images contained therein, alternate embodiments are also possible, including embodiments with tanks or other substantially water-tight vessels adapted to provide simultaneous decontamination of any number of watercraft.

In some embodiments, the substantially water-tight vessel is sized or adapted to permit entry and decontamination of multiple watercraft side-by-side. In some such embodiments, there are structures provided that may assist watercraft operators with entry to or exit from the watercraft while the watercraft are disposed in the substantially water-tight vessel. As may be appreciated, the water circulation equipment (e.g. pipes, pumps, etc.), water filtration equipment, water chlorination equipment, water heating equipment, etc. may be sized to accommodate the increased size of the substantially water-tight vessel, and one of ordinary skill in the art will appreciate modifications to such to achieve desired performance characteristics in accordance with the particular described embodiments.

In other embodiments, the substantially water-tight vessel is sized or adapted to permit entry and decontamination of multiple watercraft back-to-back (e.g., with entry points at either end of an elongated substantially water-tight vessel). In some such embodiments, the substantially water-tight vessel slopes from either end toward a central portion of the substantially water-tight vessel such that trailered watercraft can be backed into the substantially water-tight vessel from either end.

In other embodiments, the substantially water-tight vessel is sized or adapted to permit entry and decontamination of multiple watercraft in a fanned configuration. In some such embodiments, the substantially water-tight vessel is formed as a portion of a generally circular shape, such as in a semi-circular shape, a quarter circle shape, a three-quarter circle shape, a whole circle shape, or any fraction thereof. The substantially water-tight vessel in some embodiments is deeper toward the rotational center of the partially circular shape, allowing watercraft to be backed into the substantially water-tight vessel at any point around the circumferential edge of the partially circular shape. The rotational center of the substantially water-tight vessel may be contained within the substantially water-tight vessel, or may at a location outside of the substantially water-tight vessel, such as at a platform or other structure outside the substantially water-tight vessel. The platform or other structure in some embodiments optionally provides access to watercraft for a watercraft operator during decontamination.

In some embodiments, including embodiments similar in size, shape, or configuration to any of those discussed previously, the substantially water-tight vessel is provided with an alternate mechanism or method for disposing the watercraft within the water-tight vessel. By way of example, while embodiments of the substantially water-tight vessel have been described as having a sloped bottom to permit backing a trailered watercraft into the substantially water-tight vessel, other embodiments of the substantially water-tight vessel utilize a mechanized or hydraulic lift structure to provide raising or lowering of the trailered watercraft out of or into the substantially water-tight vessel. In such an embodiment, the vehicle towing the trailer may enter an above-water structure towing the watercraft, and can then disconnect the trailer from the towing vehicle and can secure the trailer on the structure. After the towing vehicle pulls away, the structure with the trailer thereon is lowered into the water. Such an embodiment may allow for hot-water decontamination of a greater length of some watercraft (and trailers) than some back-in-type embodiments. Accordingly, such an embodiment may have particular applicability in situations where decontamination of forward portions of a watercraft is particularly desirable, such as when a watercraft has been in a contaminated body of water for a longer period of time, or in instances where a watercraft has water intake structures (e.g., for ballast purposes) at a forward portion of the watercraft.

Embodiments of systems for decontamination of watercraft include a substantially water-tight vessel, a water heating system operatively connected to the substantially water-tight vessel, a water circulation system operatively connected with the substantially water-tight vessel and the water heating system, one or more appropriate water cleaning/filtration systems, as necessary, and appropriate structures housing the various systems included in the system for decontamination of watercraft.

The water heating systems, the water circulation systems, and the water cleaning/filtration systems may be varied from application to application, as desired. By way of example, in some embodiments, the water heating systems utilize a combustible gas as a heating source, such as natural gas, propane, or the like. In other embodiments, the water heating system utilizes another heating fuel such as fuel oil or coal. In other embodiments, the water heating systems utilize solar heating, at least in part, to heat the water in the decontamination system. In still other embodiments, the water heating systems utilize electric heating either from grid electricity or from solar power sources. In still other embodiments, the water heating systems make use of natural geothermal energy present at the location. Essentially any appropriate water heating system can be used so long as the water heating system provides appropriate heating capacity to maintain water in the substantially water-tight vessel at a desired water temperature for the surrounding environmental conditions.

Accordingly, embodiments of the invention are not limited to any particular heating system. Nevertheless, by way of one particular example, one embodiment of the decontamination system utilizes an APEX commercial condensing boiler, model APX725C (725,000 BTU/hr input at high fire) or model AMP-1000 (1,000,000 BTU/hr input at high fire) from Thermal Solutions of Lancaster, Pa. running on liquefied petroleum gas (LPG)/propane/butane or natural gas. In some such embodiments, the decontamination system includes one or more LPG storage tanks (e.g., two 1,000-gallon LPG tanks) to serve as a source of energy for the water heating system (as well as potentially a source of electricity for the water circulation and/or water filtration systems, as necessary). Any necessary fuel connections are included in some such embodiments.

Similarly, the water circulation system may utilize any appropriate circulation system, but typically includes a water circulation pump. The water circulation pump may operate on electricity from a grid or provided on site (e.g., using a generator operating on LPG or from a solar panel system), or may be a stand-alone pump with its own power supply (e.g., a LPG-powered water pump operating from the LPG tanks or a gasoline-powered pump with a gasoline supply tank). One of ordinary skill in the art will be able to select any of a variety of pumps to include in the decontamination system, but by way of specific example, one embodiment of the decontamination system utilizes a Grundfos CR10-01 pump from Lenntech B.V. (Netherlands)/Lenntech USA LLC (Miami, Fla.). The pump selected should be capable of circulating water through the filtration system and heating system at a desired rate (e.g., to turn over all the water in the substantially water-tight vessel every eight to twelve hours, for example) at the water's anticipated temperature (between approximately 100 degrees Fahrenheit (approximately 38 degrees Celsius) and approximately 110 degrees Fahrenheit (approximately 43 degrees Celsius)) without overheating or shutting off.

The water filtration system, if present, may utilize any appropriate automatically cleaned or manually cleaned filtration media, and the overall filtration capability of the water filtration system should ensure filtration down to no larger than 63 microns (for capture of veligers) or other appropriate size for the desired decontamination effects. One of ordinary skill in the art will readily be able to determine water filtration specifications, including filtration size, filtration media, flow rates, and the like. Nevertheless, by way of example, one embodiment of the decontamination system includes a filtration system including a BGFS-0100 filter by Amiad Water Systems of Moorseville, N.C., providing approximately 30 gallons per minute (approximately 114 liters per minute) flow with filtration to 25 microns. In some embodiments of the decontamination system, the filtration system further includes a pre-filter, such as an Eaton Model 30R simplex basket strainer (model ST30R015AT40A) from Eaton Corporation PLC of Cleveland, Ohio. Water filtration equipment may be cleaned/changed as necessary.

As may be appreciated, in some embodiments the optimal location(s) for the watercraft decontamination system may be at locations were grid power and grid fuel (e.g., a natural gas or fuel oil supply line) are not available. Such locations may include proximate a boat ramp or other structure or system for removing watercraft from a body of water so that decontamination can occur onsite before a watercraft is transported elsewhere. Other locations may include along major highways, such as at mandatory checkpoints or at state lines, so that watercraft being transported can be stopped for appropriate protective decontamination to protect uncontaminated bodies of water. Accordingly, embodiments of the decontamination system include appropriate power generation capability, such as an electric generator (operated by appropriate LPG or other stored fuel) or alternatively or supplemented by a solar power source. As desired, the system may include appropriate sound-mitigation equipment (e.g. a muffler, sound-dampening linings, etc.) to reduce noise from any power generation equipment or from pumps and other equipment included with the decontamination system.

In some embodiments of the decontamination system, the water heating system, the water filtration/pre-filtration system, the water circulation system, potentially a water softening system (if desired), and any power generation equipment may be at least partially pre-assembled off-site and delivered to location as a unit, such as on a pallet or skid (e.g., on a skid that is approximately eight feet long, ten feet wide, and in a structure approximately eight feet tall). Then, the unit is simply placed adjacent the substantially water-tight vessel, is operatively connected to the substantially water-tight vessel (e.g., using interconnecting polyvinyl chloride (PVC) piping) and to the fuel source (e.g., appropriate LPG tanks), and the substantially water-tight vessel is filled (potentially with water from an adjacent body of water), and the water heated before the system is placed in service. In some embodiments, the equipment unit is housed in a protective shed or house for protection and/or aesthetic purposes. Alternatively, some or all equipment may be assembled on a skid or in a temporary or permanent pump house on-site.

As discussed, the substantially water-tight vessel may take many forms and shapes; however, FIGS. 1-6 provide views of one particular illustrative embodiment of a substantially water-tight vessel, namely a dip tank 10. The dip tank 10 of the illustrated embodiment is approximately 40 feet (approximately 12.2 meters) long, approximately 7.5 feet (approximately 2.3 meters) tall, and approximately 14 feet (approximately 4.3 meters) wide. The illustrated dip tank 10 is formed to be placed on a hill (or excavation) having a 15% slope (approximately 8.5° slope) and to have a maximum water depth of approximately 5 feet (approximately 1.5 meters) prior to disposition of a watercraft therein. The dip tank 10 may be constructed on-site, or it may be constructed at a factory and transported, such as on a skid sized to hold the dip tank 10 (e.g, a skid having a length of approximately 42.25 feet (approximately 12.9 meters) and a width of approximately 15.5 feet (approximately 4.7 meters). Transportation of the dip tank 10 from the location of manufacture to the location of use may occur via rail or truck, for example.

The approximate weight of the illustrative dip tank 10, when empty, is approximately 19,000 pounds (approximately 8620 kilograms). Accordingly, the method of shipping of the dip tank 10 is selected to accommodate the size and weight of the dip tank 10. When filled to a depth of approximately 5 feet (approximately 1.5 meters), the dip tank 10 weighs approximately 93,000-94,000 pounds (approximately 42,000-42,600 kilograms). The dip tank 10 is manufactured to have a strength sufficient to accommodate the weight of the water within the dip tank 10, and the site of the dip tank 10 is prepared to accommodate the total weight of the filled dip tank 10.

Figure 5:
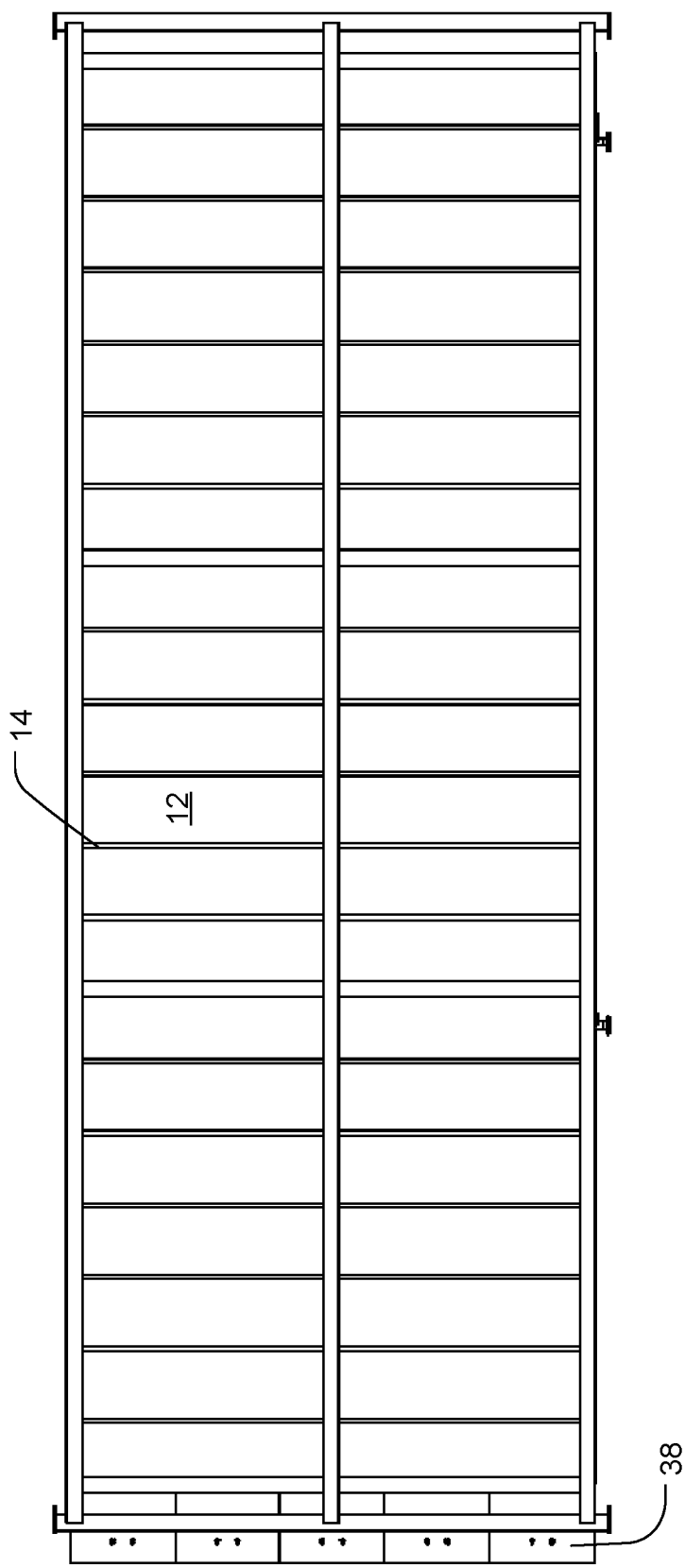
FIG. 5 illustrates a bottom view thereof.
Figure 6:
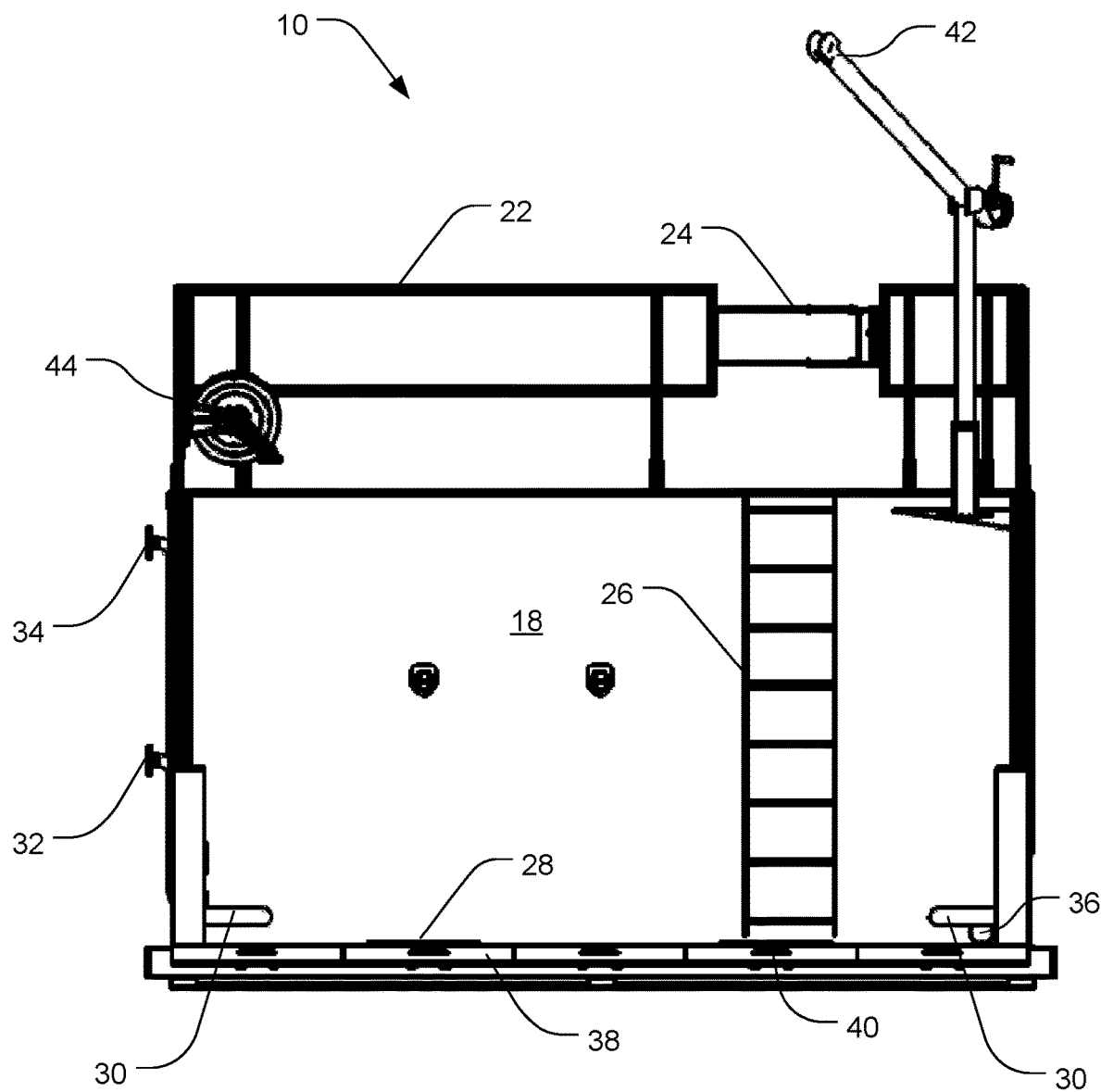
FIG. 6 illustrates an end view thereof.

In the illustrated embodiment of the dip tank 10, the dip tank 10 has a floor 12 formed of 0.25-inch (0.64 cm) plate steel disposed over appropriate steel floor frame members 14 or plate stiffeners (see FIG. 5). The dip tank also has side walls 16 and an end wall 18 formed of 0.375-inch (0.95 cm) plate steel disposed over appropriate steel wall frame members 20 or plate stiffeners. As necessary or desired, the corners where the floor 12 joins the side walls 16 and/or end wall 18 and/or where the side walls join the end wall 18 are reinforced with appropriate structural reinforcement. The interior surface of the floor 12, side walls 16 and end wall 18 of some embodiments are coated with a liner, such as a two-component epoxy phenolic lining system such as International Enviroline 2900 by Akzo Nobel N.V. of the Netherlands. In some embodiments, the liner coating has a thickness of approximately 20 mils to approximately 25 mils (approximately 0.51 mm to approximately 0.63 mm).

To minimize thermal losses of the water in the dip tank 10 through the surrounding steel, some embodiments of the dip tank 10 have an exterior coating of closed-cell foam insulation having a thickness of between approximately 1.5 inches and approximately 2 inches (approximately 3.8 cm to approximately 5.1 cm). In some embodiments, the foam insulation and/or any exterior surfaces not covered by the foam insulation are covered by urethane UV epoxy paint having an approximate thickness of between 4 and 6 mils (between approximately 0.1 mm and approximately 0.15 mm).

As is illustrated in the Figures, in some embodiments the dip tank 10 is provided with a handrail 22. The handrail 22 serves to protect against accidental entry into the dip tank 10 from the side or deep end, and further serves to provide a structure which a boat owner or dip tank operator can grasp to enter or exit a watercraft in the dip tank 10 and/or to steady him or herself while observing or participating in a decontamination procedure. In some embodiments, the handrail 22 is partially or completely removable (such as to reduce size/weight during transport). In some embodiments, the handrail 22 is provided with a gate 24 or a plurality of gates 24 that serves to facilitate entry to or from a position of the dip tank 10. In some embodiments, an egress ladder 26 is positioned at the gate 24 to facilitate egress from or entry into the dip tank 10 (typically at or toward a deep end of the dip tank 10) such as in the event of an inadvertent fall into the dip tank 10 or in the event it is necessary to retrieve objects from the dip tank 10. As may be appreciated, an exterior ladder or stairway may also be placed on an exterior of the dip tank 10 at a location corresponding to the gate 24 and egress ladder 26.

In some embodiments, the floor 12 of the dip tank 10 is provided with treads 28 to provide traction to a vehicle towing the watercraft being decontaminated. The treads 28 of some embodiments are approximately 0.75-inch (approximately 1.9-cm) square treads spaced approximately 10 inches (approximately 25 cm) apart, center-to-center. The treads 28 of some embodiments are disposed in two rows appropriately located to provide traction for towing vehicles. In some embodiments, the dip tank 10 is further provided with tire guides 30 to aid in centering a watercraft trailer as it is being disposed in the dip tank 10. The tire guides 30 may take any desirable form, such as the form of longitudinal pipes (e.g., approximately 3-inch (approximately 7.6 cm) pipe guide rails) extending near the floor 12 along the sides of the dip tank 10. In certain embodiments, the tire guides 30 are spaced approximately 11.2 feet apart (approximately 3.41 meters apart).

The dip tank 10 of certain embodiments includes one or more inlets 32 and one or more outlets 34. The inlet 32 or inlets 32 and outlet 34 or outlets 34 serve to operatively connect the dip tank 10 to the water circulation, water heating, water filtration, etc. equipment, such as in an adjacent pump house or on an adjacent equipment skid. In some embodiments, the inlet 32 or inlets 32 and outlet 34 or outlets 34 have a size of approximately 2 inches (approximately 5.1 cm). In other embodiments, the inlet 32 or inlets 32 and outlet 34 or outlets 34 have a different size. In some embodiments, the size of the inlet 32 or inlets 32 and outlet 34 or outlets 34 varies depending in part on the number of inlets 32 and outlets 34. In some embodiments, the size of the inlet 32 or inlets 32 and the outlet 34 or outlets 34 varies in part depending on the number of times it is desired to turn the water in the dip tank 10 over each day and/or on the overall size of the dip tank 10. Sizing, placing, and selecting the number of the inlets 32 and outlets 34 and the size of the accompanying water heating/circulation/filtration equipment will be a matter of routine calculation and/or experimentation. The dip tank 10 of some embodiments is also equipped with a drain 36 to allow the dip tank 10 to be drained as necessary.

In some embodiments, the dip tank 10 is provided with a ramp 38. The ramp 38 bridges the dip tank 10 and the surrounding ground, facilitating entry of a trailer and watercraft into the dip tank 10. In some embodiments, the ramp 38 is hinged and can be raised when the dip tank 10 is not in use. The ramp 38 of some embodiments is provided with handles 40 to assist with folding/raising the ramp 38 when not in use. The handles 40 of some embodiments are retractable.

In some embodiments, one or more platforms is placed or located adjacent or around the dip tank 10 during use (not shown in FIGS. 1-6). The platforms can be used to easily access the watercraft in the dip tank 10 or may be used to reach accessory devices included with the dip tank 10. One exemplary accessory device included with some embodiments is a jib crane 42 and winch. A basket (such as of stainless steel) can be removably attached to the jib crane 42 and winch, such that small items that need to be decontaminated (such as water toys, buoys, anchors, ropes, and the like) can be removed from the watercraft, disposed in the basket, and lowered into the dip tank 10 while the watercraft is being decontaminated. In some embodiments, the basket is weighted such that items placed in the basket are held underwater to ensure full decontamination.

Another exemplary accessory device included with some embodiments is a pressure washer hose reel 44. A pressure washer hose can be disposed on the hose reel 44 and while the watercraft is being decontaminated, the pressure washer can be used for spot treatment of certain locations of the watercraft that are not immersed in the water of the dip tank 10, including, but not limited to, the bilge of the watercraft. In some embodiments, the water of the pressure washer is heated to a temperature that is higher than the temperature of the water in the dip tank 10 to reduce the time of decontamination using the pressure washer or to increase the effectiveness of decontamination using the pressure washer. The pressure washer of some embodiments receives heated water from the pump house or other equipment center.

While not illustrated in the Figures, a source of additional water is provided to embodiments of the dip tank 10 system for various reasons. The additional water source of some embodiments is a tank of additional water, such as a 3,000 gallon (approximately 11,000 liter) poly water tank. In some embodiments, the additional water source is a plumbed potable or non-potable water source, such as from an existing water line at the location of the dip tank 10. The additional water source of some embodiments is used for purposes such as to prime the water pump on initial startup and to provide replacement water for the dip tank 10 as the water in the dip tank 10 evaporates or is diminished as watercraft are decontaminated over time (e.g., water that remains on removed watercraft after decontamination).

In some embodiments, the dip tank 10, prior to or after being filled with water, is provided with a number of shade balls to insulate the water in the dip tank 10 and to minimize evaporation of the water from the dip tank. The provision of shade balls is optional, and a size of the shade balls is selected so as to minimize problems such as fouling of watercraft water intake systems with the shade balls. In some embodiments, the shade balls have a diameter of at least approximately three inches and have a number sufficient to provide a monolayer over the water in the dip tank 10 when no watercraft is disposed therein.

Figure 7:
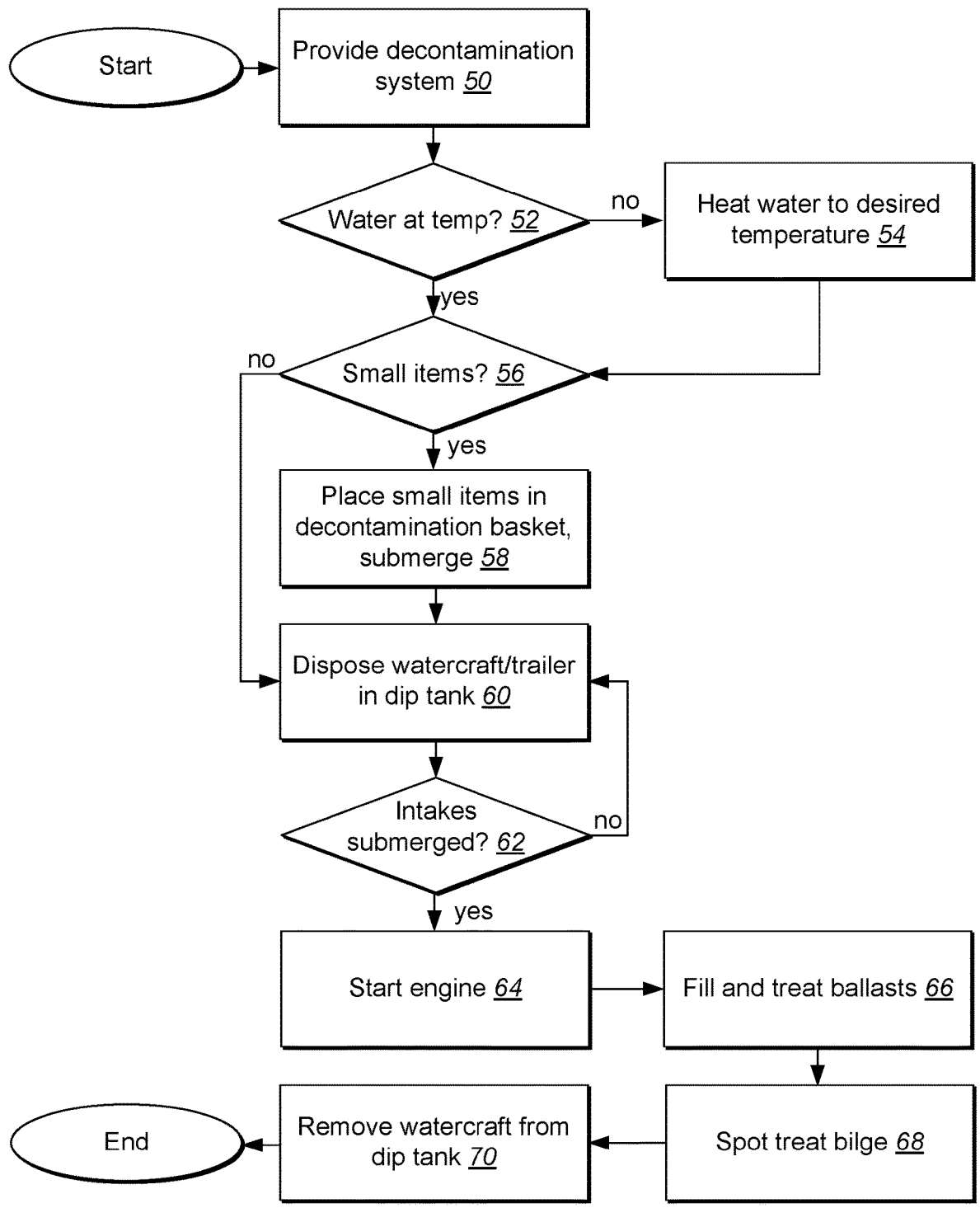
FIG. 7 illustrates a method in accordance with some embodiments of the decontamination system.

FIG. 7 illustrates a method for using embodiments of the dip tank 10 for decontamination of watercraft that have been used in a contaminated/infested body of water. The method begins at step 50, which amounts to provision of a decontamination system in accordance with the principles discussed herein. At decision block 52, a determination is made as to whether the water in the dip tank 10 is at a desired temperature (e.g., between approximately 105 degrees Fahrenheit and approximately 110 degrees Fahrenheit (approximately 40.6 degrees Celsius to approximately 43.3 degrees Celsius) for treatment of Quagga or Zebra mussels). It has been determined that water at or above approximately 105 degrees Fahrenheit (approximately 40.6 degrees Celsius) will kill Quagga and Zebra mussels and veligers in approximately 45 seconds or less.

While embodiments of the invention are particularly intended for treatment of such Quagga and Zebra mussels, it is envisioned that other embodiments may be used for decontamination of other creatures/contaminants. Accordingly, it is envisioned that water can be heated to any desired temperature. In some embodiments of the invention, the water is not heated above approximately 110 degrees Fahrenheit (approximately 43.3 degrees Celsius) to minimize the risk of scalding persons involved in decontaminating watercraft or anyone who may inadvertently fall into the dip tank 10. Nevertheless, unless specifically so indicated in the claims, embodiments of the invention are not limited to use of water at any single temperature or temperature range.

If the water in the dip tank 10 is not at a desired temperature (e.g., at the start of the day the temperature may have decreased overnight when the decontamination system was not in use), the method proceeds to step 54, where the water in the dip tank 10 is heated and circulated until reaching the desired temperature. Once a determination is made at decision block 52 that the water is at a desired temperature or the water has been properly heated at step 54, the method proceeds to optional decision block 56, where a determination is made as to whether there are any small items (e.g., water toys, buoys, anchors, ropes, life jackets, and the like) that should be subject to separate decontamination. If so, the method proceeds to step 58, where the small items are placed in the decontamination basket and submerged for at least the desired time (e.g., at least 45 seconds) in the dip tank 10 using the jib crane 42 and winch. As may be appreciated, the decontamination of small items in the dip tank 10 may occur before, during, or after decontamination of the watercraft, even though the method of FIG. 7 depicts such decontamination occurring before disposition of the watercraft in the dip tank 10.

Regardless, the method then proceeds to step 60, where the watercraft to be decontaminated is disposed in the dip tank 10. The disposition of the watercraft in the dip tank 10 can occur by any desired method. For example, if the dip tank 10 is of a type using a hydraulic or mechanical lift or the like, as previously described, the trailered watercraft is towed or otherwise moved onto the lift structure (either in forward or reverse). In some embodiments, the trailered watercraft is then unhitched from the towing vehicle (if any) and may optionally be secured to the lift structure. The lift is then operated to lower the trailered watercraft into the dip tank.

If, instead, the dip tank 10 is of the type depicted in FIGS. 1-6, then the trailered watercraft is backed into the dip tank 10 at least until the raw water intake system(s) of the watercraft are submerged in the water in the dip tank 10. In many instances, the watercraft is backed into the dip tank 10 until the water in the dip tank reaches the normal waterline of the watercraft. In any event, at decision block 62, a determination is made as to whether the water intake(s) of the watercraft are submerged (if the watercraft is sufficiently backed in).

Once the proper positioning is reached, the watercraft is stopped (and the towing vehicle secured against movement, if necessary), and the method proceeds to step 64, where the engine of the watercraft is started. If necessary, the engine of the watercraft is appropriately lowered to be placed in the water of the dip tank 10 as part of this step. The method then proceeds to step 66, where any ballasts of the watercraft are filled using the hot water from the dip tank 10. The heated water is circulated through the raw water systems of the watercraft until the ballasts have been treated (e.g., have been exposed for a desired treatment time, e.g., at least 45 seconds), and the engine has been operated for a desired minimum time (e.g., at least 45 seconds). The ballasts can then be emptied and are considered decontaminated.

The method then proceeds to step 68, where the bilge of the watercraft is treated using a spot treatment. This spot treatment uses a hose or pressure washer hose that is supplied with hot water. The hot water of the hose or pressure washer is either the same temperature of the water in the dip tank 10 or optionally is hotter than the water in the dip tank. Typically, the operator of the watercraft is further expected to clean, drain, and dry the bilge after the treatment as well to ensure full decontamination.

Once the treatments are complete and the watercraft has been in the dip tank 10 for a desired treatment time, the bilge and ballast systems are drained while the watercraft is still in the dip tank 10 to conserve the water of the decontamination system. Then, the engine is turned off and the method proceeds to step 70, where the watercraft is slowly removed from the dip tank 10 to allow the water to trickle off of and out of the watercraft and trailer, and then the watercraft is pulled clear of the dip tank having been fully decontaminated. Any small items that were decontaminated in step 58 are returned to the watercraft or the watercraft operator.

The decontamination system can be used for any type of watercraft that is subject to decontamination. Such watercraft include boats such as fishing boats, ski boats, wake ski boats, pontoon boats, inflatable boats, rigid and semi-rigid boats, sail boats, and the like. Such watercraft also include personal watercraft such as wave runners/wake runners, jet skis, float tubes, stand-up paddle boards, surfboards, and the like, and may also include auxiliary systems such as flyboards, hoverboards, jet packs, and the like that are commonly powered by personal watercraft systems (such systems may potentially require pumping hot water from the dip tank 10 therethrough using the watercraft engine). Such watercraft can further include inflatables such as inflatable toys, inflatable water houses, rafts, float tubes, and the like. Such watercraft can also include other watercraft such as kayaks, canoes, and the like. As may be appreciated, embodiments of the decontamination system can be used for essentially any type of watercraft as well as any related equipment, as long as such watercraft or equipment is capable of being placed in the dip tank 10. Accordingly, there is no limit to the items being decontaminated that is intended by this description.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A watercraft decontamination system comprising:
    an elongate, substantially water-tight vessel defining a chamber sized and shaped to accommodate a watercraft to be decontaminated, said chamber being defined by an end wall, two sidewalls longitudinally extending from said end wall, and an inclined bottom wall terminating at an upper end of said chamber opposite said end wall and being capable of supporting a watercraft on a trailer as it is backed into the chamber, the vessel containing water sufficient to facilitate disposition of the watercraft in the chamber such that the a rear portion and transom of the watercraft that are normally submerged during watercraft operation are submerged in the water in the elongate, substantially water-tight vessel;

a water heating system capable of heating the water in the chamber to approximately 100° F. to 110° F. and maintaining the heated water at that temperature, is operatively connected to the substantially water-tight vessel, so as to heat the water within the chamber; and a water circulation system operatively connected to the elongate, substantially water-tight vessel and the water heating system, such that water circulation system is capable of circulating water between the water heating system and the chamber.

2. The watercraft decontamination system as recited in claim 1, wherein the elongate, substantially water-tight vessel has a length of at least approximately 30 feet, and a width of at least approximately 14 feet.

3. The watercraft decontamination system as recited in claim 1, wherein the inclined bottom wall has an approximate slope of 7 to 10 degrees from horizontal.

4. The watercraft decontamination system as recited in claim 3, wherein the inclined bottom wall has an approximate slope of 8.5 degrees from horizontal.

5. The watercraft decontamination system as recited in claim 1, wherein the inclined bottom wall is equipped with tire guides to keep a trailer on which the watercraft is disposed centered while being backed into the elongate, substantially water-tight vessel.

6. The watercraft decontamination system as recited in claim 1, wherein the inclined bottom wall is equipped with traction-assist treads to facilitate traction of a vehicle towing a trailer on which the watercraft is disposed.

7. The watercraft decontamination system as recited in claim 1, further comprising a plurality of shade balls disposed on a surface of the water in the chamber of the elongate, substantially water-tight vessel so as to minimize water loss through evaporation, to retain heat, and reduce algae growth.

8. The watercraft decontamination system as recited in claim 7, wherein the plurality of shade balls have a diameter of at least approximately three inches.

9. The watercraft decontamination system as recited in claim 1, further comprising a ladder to facilitate a person's entry to and exit from the chamber of the elongate, substantially water-tight vessel.

10. The watercraft decontamination system as recited in claim 1, further comprising a handrail extending vertically from the top of at least one of the end wall or either sidewall to prevent a person's accidental entry into the chamber of the elongate, substantially water-tight vessel.

11. The watercraft decontamination system as recited in claim 1, further comprising a water filtration system.

12. The watercraft decontamination system as recited in claim 11, wherein the water filtration system includes a prefilter.

13. The watercraft decontamination system as recited in claim 11, wherein the water filtration system includes a filtration media have a pore size of 63 microns or less.

14. The watercraft decontamination system as recited in claim 11, wherein the water circulation system is sized to be capable of turning over the water in the chamber of the elongate, substantially water-tight vessel a minimum of approximately three times per day.

15. The watercraft decontamination system as recited in claim 1, further comprising a ramp which bridges said upper end of said chamber opposite said end wall and the surrounding ground, facilitating entry of a trailer and watercraft into the elongate, substantially water-tight vessel.

16. The watercraft decontamination system as recited in claim 15, wherein the ramp is connected to said elongate, substantially water-tight vessel by a hinge so that it may be raised when not in use.

17. The watercraft decontamination system as recited in claim 16, wherein the ramp is provided with handles to assist with folding/raising the ramp.

\* \* \* \* \*